United States Patent
Wang

[19]

[11] Patent Number: 5,941,399
[45] Date of Patent: Aug. 24, 1999

[54] UPRIGHT POST AND BOARD HOLDER ARRANGEMENT FOR RACKS

[76] Inventor: Wen-Tsan Wang, P.O. Box 82-144, Taipei, Taiwan

[21] Appl. No.: 08/957,896

[22] Filed: Oct. 27, 1997

[51] Int. Cl.$^6$ .................................................... A47B 57/00
[52] U.S. Cl. .......................... 211/187; 211/207; 248/243; 248/297.21
[58] Field of Search ..................................... 211/187, 190, 211/41.17, 207, 90.01, 90.02, 90.04, 107, 126.1, 126.11, 126.12, 89.01, 119.003; 248/243, 297.21, 222.13, 222.12, 222.11, 222.52, 223.41, 298.1

[56] References Cited

U.S. PATENT DOCUMENTS

| | | | |
|---|---|---|---|
| 919,526 | 4/1909 | Belcher | 248/243 X |
| 2,677,519 | 5/1954 | Hobson | 211/207 X |
| 3,351,313 | 11/1967 | Guillon | 248/297.21 X |
| 4,534,473 | 8/1985 | Post | 211/207 X |
| 4,614,273 | 9/1986 | Ishii | 211/207 X |
| 5,268,821 | 12/1993 | Wong | 211/41.17 X |
| 5,297,009 | 3/1994 | Gelex et al. | 211/41.17 X |
| 5,623,880 | 4/1997 | Kuntz | 211/90.01 X |
| 5,645,257 | 7/1997 | Ward | 211/187 X |
| 5,695,163 | 12/1997 | Tayar | 248/243 |

*Primary Examiner*—Daniel P. Stodola
*Assistant Examiner*—Khoa Tran
*Attorney, Agent, or Firm*—A & J

[57] ABSTRACT

An upright post and board holder arrangement includes two clamp blocks threaded onto a double-thread screw rod and moved with a slide block in longitudinal sliding grooves on an upright post. A board holder is fixedly connected to the double-thread screw rod and turned within 180° angle between a upward position where the clamp blocks are moved inwards along the screw rod and clamped on the slide block to fix the slide block in position, and a downward position where the clamp blocks are moved apart from the slide block along the screw rod for permitting the slide block and the clamp blocks to be moved along the longitudinal sliding grooves of the upright post to the desired elevation.

1 Claim, 4 Drawing Sheets

UPRIGHT POST AND BOARD HOLDER ARRANGEMENT FOR RACKS

BACKGROUND OF THE INVENTION

The present invention relates to an upright post and board holder arrangement for racks for holding things that can be conveniently and quickly set up.

Regular racks for holding things are commonly comprised of a plurality of upright boards connected together by transverse connecting means, and board holders fastened to the upright posts for holding boards horizontally at different elevations for carrying things. These board holders are fastened to the upright posts by screw bolts. The main drawback of this design of rack is its complicated assembly procedure. Another drawback of this design of rack is its complicated procedure in adjusting the elevations of the board holders.

SUMMARY OF THE INVENTION

The present invention has been accomplished to provide an upright post and board holder arrangement for racks which eliminates the aforesaid drawbacks. According to the preferred embodiment of the present invention, the upright post and board holder arrangement comprises an upright post having longitudinal sliding grooves equiangularly spaced around the periphery, a double-threaded screw rod, a slide block coupled to the double-threaded screw rod, two clamp blocks respectively threaded onto the two reversed threads of the double-thread screw rod and moved with the slide block in the longitudinal sliding grooves of the upright post, and a board holder fixedly connected to the double-thread screw rod and turned within 180° angle between a first position where the clamp blocks are moved inwards along the screw rod and clamped on the slide block to fix the slide block in position, and a second position where the clamp blocks are moved apart from the slide block along the screw rod for permitting the slide block and the clamp blocks to be moved along the longitudinal sliding grooves of the upright post to the desired elevation.

DETAILED DESCRIPTION OF THE PREFERRED EMBODIMENT

Figure 1:
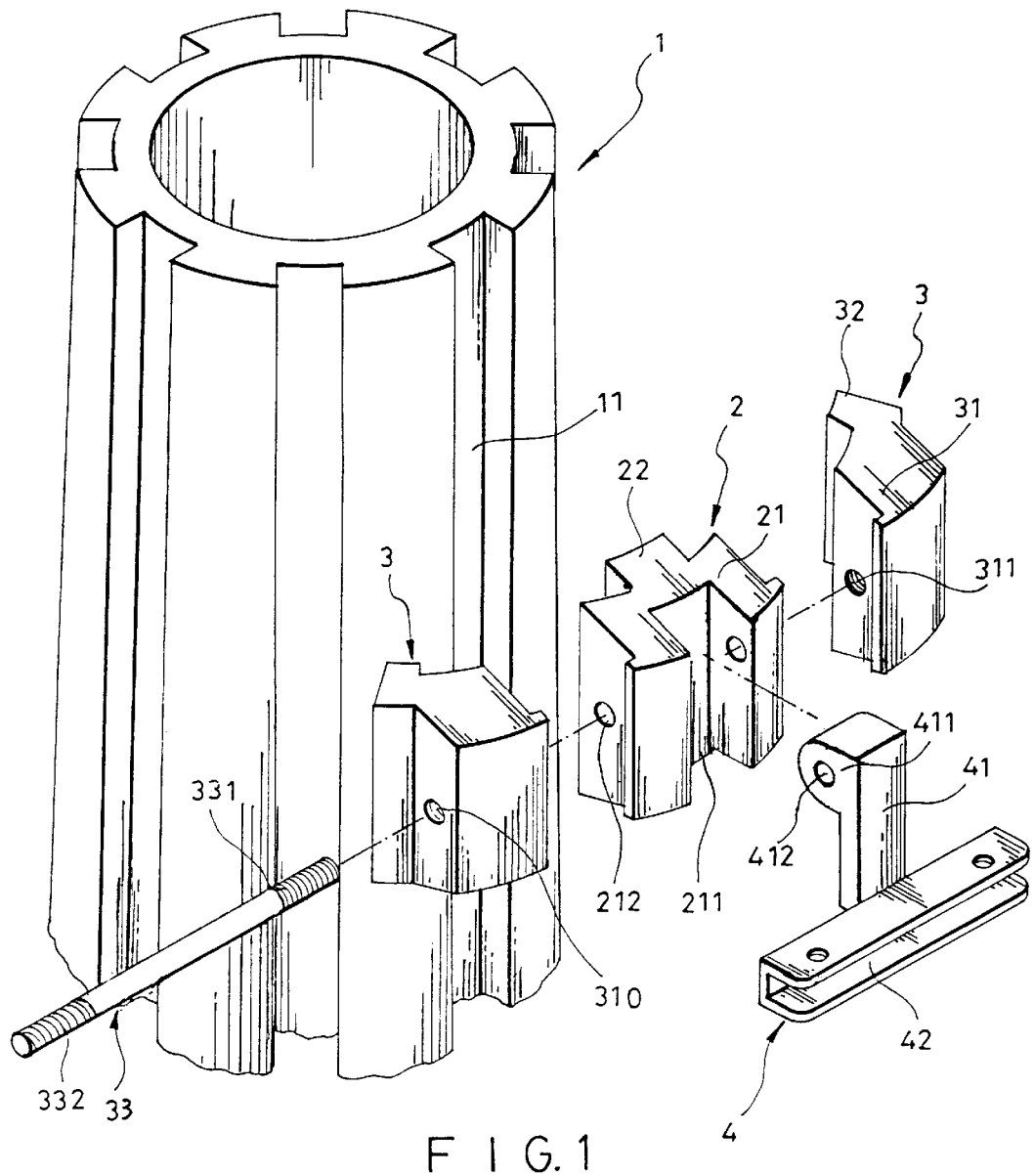
FIG. 1 is an exploded view of the present invention.

Referring to FIG. 1, an upright post and board holder arrangement in accordance with the present invention is generally comprised of an upright post 1, a slide block 2, two clamp blocks 3, a screw rod 33, and a board holder 4.

The upright post 1 comprises a plurality of sliding groove 11 equiangularly spaced around the periphery and longitudinally extended through its length. The slide block 2 comprises a substantially U-shaped base 21, a longitudinal mounting groove 211 defined within the U-shaped base 21 at its front side, a coupling block 22 raised from the U-shaped base 21 at its back side and adapted for coupling to one sliding groove 11 of the upright post 1, and two transverse through holes 212 transversely pierced through the U-shaped base 21 and aligned at two opposite lateral sides of the longitudinal mounting groove 211. Each clamp block 3 comprises a base 31 adapted to clamp on one side of the U-shaped base 21, and a coupling block 32 raised from the base 31 at its back side and adapted for coupling to one sliding groove 11 of the upright post 1. Further, a right-handed screw hole 310 and a left-handed screw hole 311 are respectively transversely provided at the bases 31 of the clamp blocks 3 for connection to the transverse through holes 212 of the U-shaped base 21 of the slide block 2. The board holder 4 comprises a bar 41, a smoothly arched mounting base 411 horizontally backwardly raised from one end of the bar 41 and defining a transverse through hole 412, and a channel-like holder base 42 transversely raised from an opposite end of the bar 41 and adapted for holding a board 5 (see FIG. 5). The screw rod 33 has a left-handed thread 331 at one end and a right-handed thread 332 at an opposite end adapted for threading into the left-handed screw hole 311 and the right-handed screw hole 310 of the clamp blocks 3 respectively.

Figure 2:
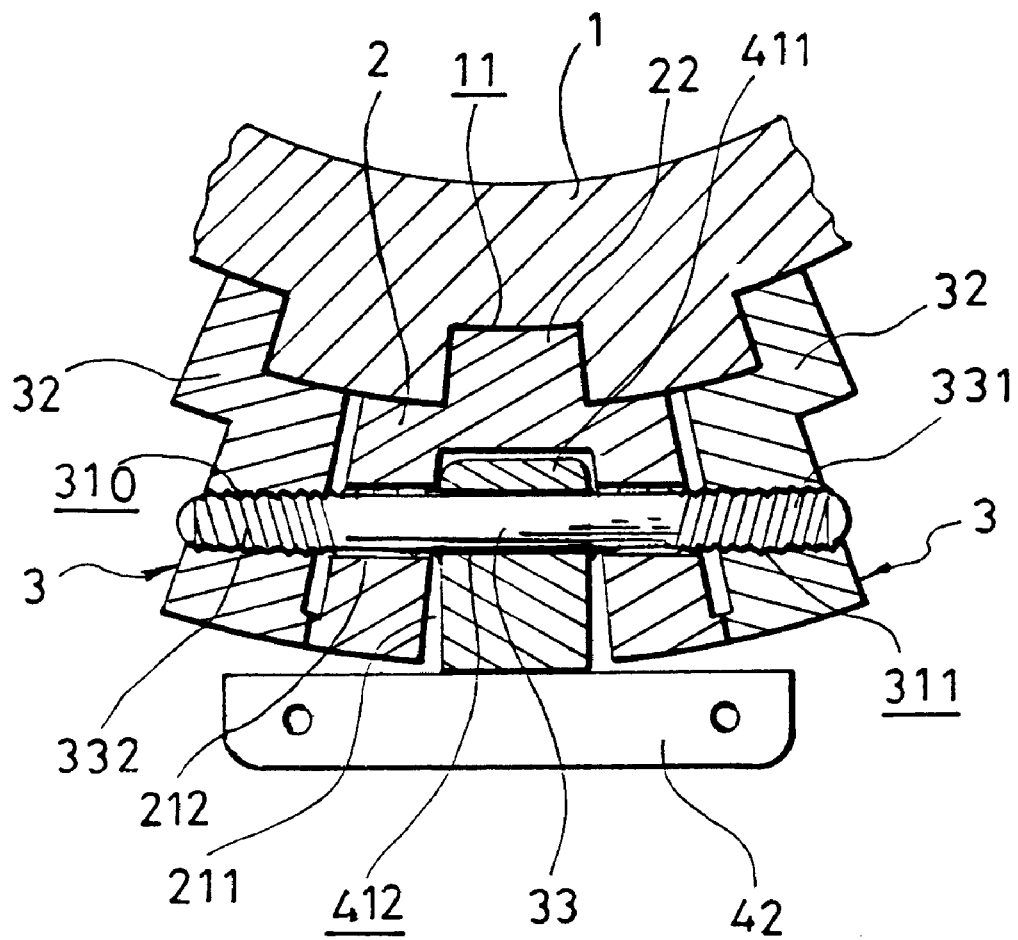
FIG. 2 is a top view in section showing the assembly of FIG. 1 assembled.

Referring to FIG. 2 and FIG. 1 again, the mounting base 411 of the board holder 4 is inserted into the longitudinal mounting groove 211 of the slide block 2, permitting the transverse through hole 412 of the mounting base 411 of the board holder 4 to be aligned between the transverse through holes 212 on the U-shaped base 21 of the slide block 2, then the screw rod 33 is inserted through the transverse through holes 212 on the U-shaped base 21 of the slide block 2 and the transverse through hole 412 on the mounting base 411 of the board holder 4, and then the mounting base 411 is fixedly fastened to a middle part of the screw rod 33 by welding, and then the clamp blocks 3 are respectively mounted on the screw rod 33, permitting the left-handed thread 331 and right-handed thread 332 of the screw rod 33 to be respectively threaded into the left-handed screw hole 311 and the right-handed screw hole 310 of the clamp blocks 3 respectively, and then coupling block 22 of the slide block 2 and the coupling blocks 32 of the clamp blocks 3 are respectively inserted into three adjacent sliding grooves 11 on the upright post 1.

Figure 3:
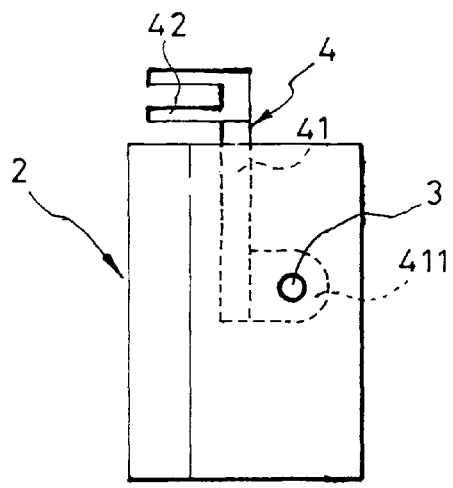
FIG. 3 is a side plain view of the present invention, showing the board holder turned to the upper limit position and the slide block released.
Figure 4:
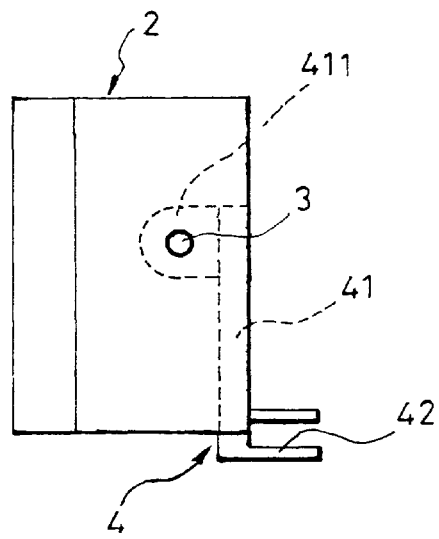
FIG. 4 is another side plain view of the present invention, showing the board holder turned to the lower limit position and the slide block locked.

Referring to FIGS. 3 and 4, when the board holder 4 is turned upwards through 180° angle, the screw rod 33 is turned with the board holder 4 in one direction, causing the clamp blocks 4 to move apart from the slide block 2 at a distance about half of the thread pitch, therefore the sliding block 2 is released and allowed to be moved with the clamp blocks 3 along the sliding grooves 11 to the desired elevation (see FIG. 3); on the contrary, when the board holder 4 is turned downwards from the position shown in FIG. 3 to the position shown in FIG. 4, the screw rod 33 is turned with the board holder 4 is the reversed direction, causing the clamp blocks 3 to clamp on the sliding block 2, and therefore the sliding block 2 and the clamp blocks 3 are fixed to the sliding grooves 11 of the upright post 1 at the desired elevation.

Figure 5:
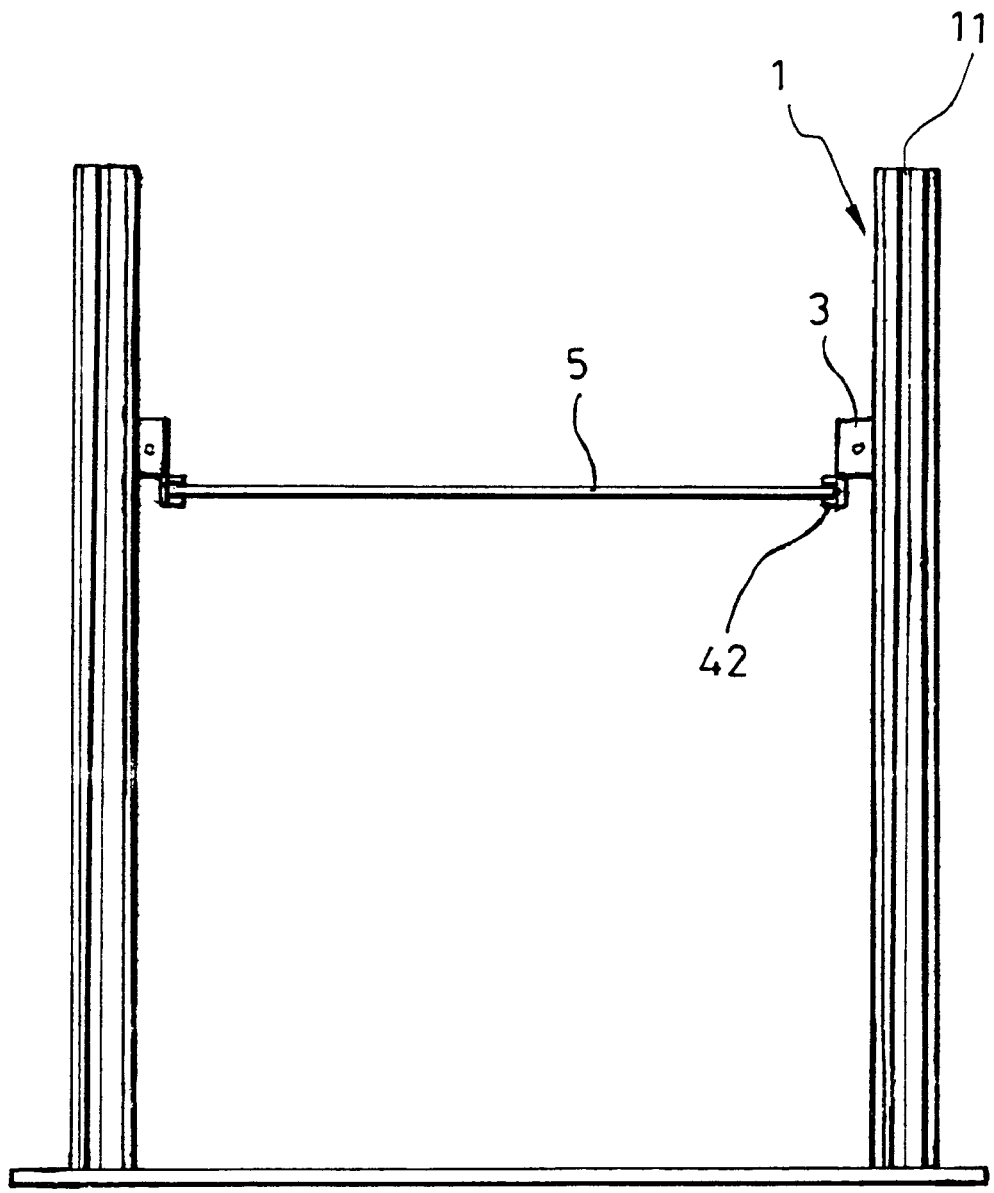
FIG. 5 is an applied view of the present invention, showing a board supported on two board holders between two upright posts.

Referring to FIG. 5, when two upright posts 1 are set up, a board 5 can be supported on the channel-like holder bases 42 of two board holders 4 between the two upright posts 1.

While only one embodiment of the present invention has been shown and described, it will be understood that various modifications and changes could be made thereunto without departing from the spirit and scope of the invention disclosed.

What the invention claimed is:

1. The upright post and board holder arrangement comprising:

an upright post having a plurality of sliding grooves equiangularly spaced around the periphery and longitudinally extended through a length of said upright post;

a slide block movable in one sliding groove of said upright post, said slide block comprising a substantially U-shaped base, a longitudinal mounting groove defined within said U-shaped base at a front side, a coupling block raised from said U-shaped base at a back side and adapted and coupled to one sliding groove of said upright post, and two transverse through holes transversely pierced through said U-shaped base and aligned at two opposite lateral sides of said longitudinal mounting groove;

a first clamp block movable in one sliding groove of said upright post and adapted to clamp on one side of said slide block, said first clamp block having a right-handed screw hole adapted for connecting to the transverse through holes of said slide block at one side;

a second clamp block movable in one sliding groove of said upright post and adapted to clamp on one side of said slide block opposite to said first clamp block, said second clamp block having a left-handed screw hole adapted for connecting to the transverse through holes of said slide block at one side;

a screw rod inserted through the transverse through holes of said slide block, said screw rod having a right-handed thread at one end threaded into the right-handed screw hole of said first clamp block, and a left-handed thread at an opposite end threaded into the left-handed screw hole of said second clamp block; and a board holder fixedly fastened to said screw rod and adapted to hold a board for carrying things, said board holder comprising a bar, a smoothly arched mounting base horizontally backwardly raised from one end of said bar and fixedly mounted connected to said screw rod and disposed in the longitudinal mounting groove of said slide block, and a channel-like holder base transversely raised from an opposite end of said bar and adapted for holding a board, said board holder being turned vertically within 180° angle between a first position where said clamp blocks are moved inwards along said screw rod and clamped on said slide block to fix said slide block in position, and a second position where said clamp blocks are moved apart from said slide block along said screw rod for permitting said slide block and said clamp blocks to be moved along the longitudinal sliding grooves of said upright post to the desired elevation.

* * * * *